United States Patent
Mandziy et al.

(10) Patent No.: US 12,026,344 B2
(45) Date of Patent: Jul. 2, 2024

(54) HOVER DETECTION FOR TOUCHSCREENS

(71) Applicant: Cypress Semiconductor Corporation, San Jose, CA (US)

(72) Inventors: Vasyl Mandziy, Lviv (UA); Andriy Maharyta, Lviv (UA); Oleksandr Karpin, Lviv (UA); Mykhaylo Krekhovetskyy, Lviv (UA); Volodymyr Bihday, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 18/074,623

(22) Filed: Dec. 5, 2022

(65) Prior Publication Data

US 2024/0184412 A1 Jun. 6, 2024

(51) Int. Cl.
*G06F 3/044* (2006.01)

(52) U.S. Cl.
CPC .. *G06F 3/0446* (2019.05); *G06F 2203/04108* (2013.01)

(58) Field of Classification Search
CPC ........ G06F 3/041; G06F 3/044; G06F 3/0446; G06F 3/04883; G06F 2203/04101; G06F 2203/04108
See application file for complete search history.

(56) References Cited

U.S. PATENT DOCUMENTS

| | | | | |
|---|---|---|---|---|
| 9,213,458 B2 * | 12/2015 | Hills | ...................... | G06F 3/0446 |
| 10,963,098 B1 * | 3/2021 | Zoubir | ................ | G06F 3/04186 |
| 2010/0060609 A1 * | 3/2010 | Doi | ........................ | G06F 3/0445 |
| | | | | 341/5 |
| 2011/0007021 A1 * | 1/2011 | Bernstein | .............. | G06F 3/0446 |
| | | | | 715/702 |
| 2011/0120784 A1 * | 5/2011 | Osoinach | ................ | G06F 3/044 |
| | | | | 178/18.06 |
| 2012/0113018 A1 * | 5/2012 | Yan | ...................... | G06F 3/04883 |
| | | | | 345/173 |
| 2014/0009428 A1 * | 1/2014 | Coulson | .............. | G06F 3/04166 |
| | | | | 345/174 |
| 2015/0103043 A1 * | 4/2015 | Hills | .................... | G06F 3/04166 |
| | | | | 345/174 |
| 2015/0200444 A1 * | 7/2015 | Mercer | ................ | H01Q 1/2258 |
| | | | | 29/601 |
| 2016/0070413 A1 * | 3/2016 | Geaghan | ............. | G06F 3/04186 |
| | | | | 345/174 |
| 2016/0306458 A1 * | 10/2016 | Hong | ................... | G06F 3/04166 |
| 2016/0357317 A1 * | 12/2016 | Kim | ..................... | G06F 3/04166 |
| 2017/0032114 A1 * | 2/2017 | Turgeman | ............. | H04W 12/06 |
| 2017/0177109 A1 * | 6/2017 | Polishchuk | ......... | G06F 3/03545 |
| 2018/0232106 A1 * | 8/2018 | Zhang | ................... | G06F 3/0304 |
| 2020/0182995 A1 * | 6/2020 | Zeng | ..................... | G01S 13/003 |

* cited by examiner

*Primary Examiner* — Amy Onyekaba

(57) ABSTRACT

Measured signal data, detected by a sensor array of a device, is used to create a generated representation from the measured signal data. The generated representation is compared with a measured representation of the measured signal data to create a correlation coefficient corresponding to a correlation between the generated representation and the measured representation of the measured signal data. A hover event is detected for the device if the correlation coefficient exceeds a first threshold. If the correlation coefficient does not exceed the first threshold, then the measured signal data is determined to not be indicative of a hover event.

20 Claims, 9 Drawing Sheets

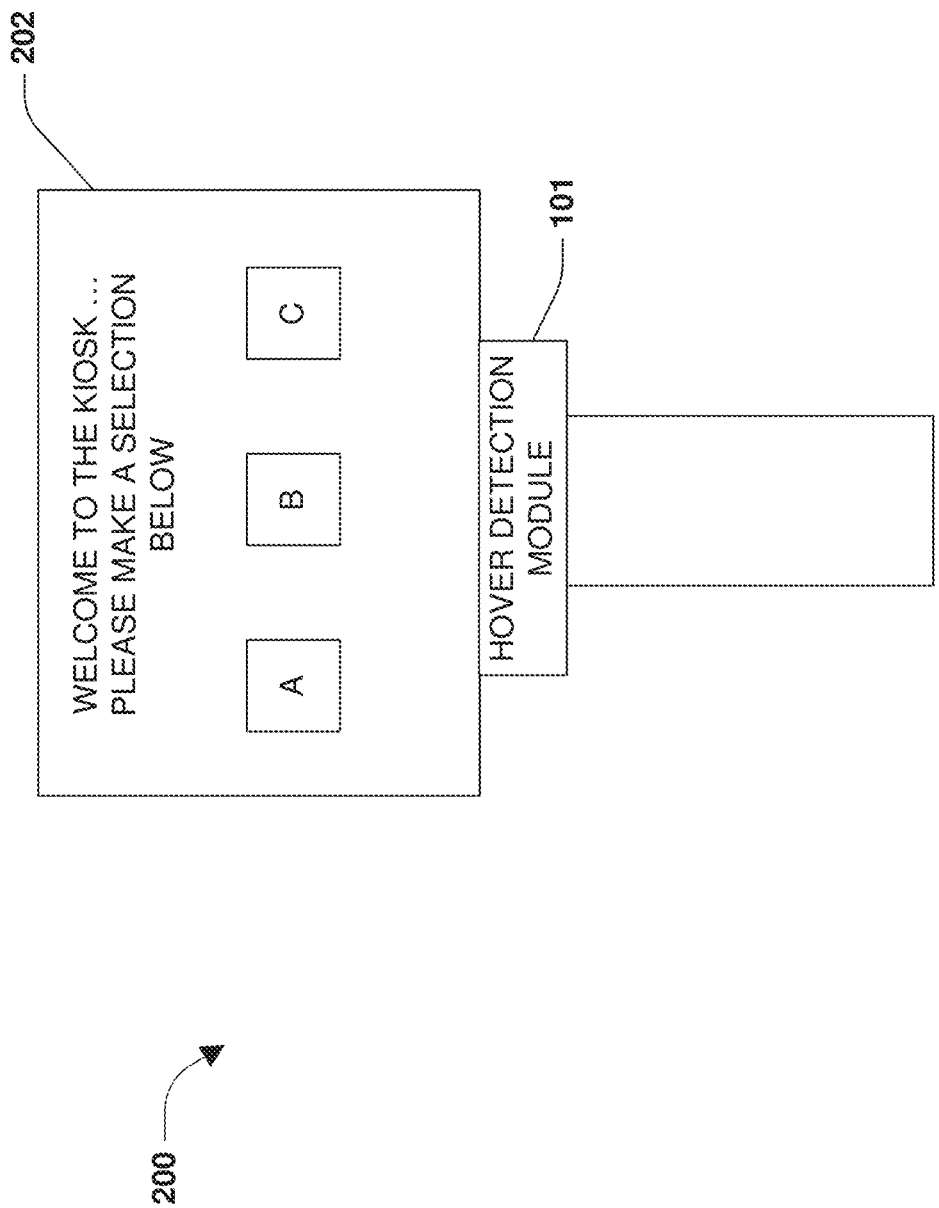

HOVER DETECTION FOR TOUCHSCREENS

TECHNICAL FIELD

The present disclosure relates to the field of hover detection for touchscreens.

BACKGROUND

Many devices include touchscreens through which users can interface with the devices. For example, an airport kiosk may allow users to access and print boarding passes through touch or hover gestures. A multifunction printer may allow users to access various functions of the multifunction printer such as copy functionality, faxing functionality, scanning functionality, etc. using touch or hover gestures. These devices may utilize intelligent touchless human-machine interfaces (HMIs) that can be used to detect hover gestures for low resolution icon-based touchscreens, such as kiosks, printers, and industrial panels, in order to minimize physical contact with the touchscreens and improve cleanliness (e.g., reduce the spread of germs).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, a method is provided. The method includes creating a generated representation from measured signal data in response to receiving the measured signal data detected by a sensor array of a device. The generated representation is compared with a measured representation of the measured signal data to create a correlation coefficient corresponding to a correlation between the generated representation and the measured representation of the measured signal data. In response to the correlation coefficient exceeding a hover threshold, a hover event for the device is detected. In response to the correlation coefficient not exceeding the hover threshold, a determination is made that the measured signal data is not indicative of the hover event.

In an embodiment of the techniques presented herein, an apparatus is provided. The apparatus includes a means for creating a generated representation from measured signal data in response to receiving the measured signal data detected by a sensor array of a device. The apparatus includes a means for comparing the generated representation with a measured representation of the measured signal data to create a correlation coefficient corresponding to a correlation between the generated representation and the measured representation of the measured signal data. The apparatus includes a means for detecting a hover event for the device in response to the correlation coefficient exceeding a hover threshold. The apparatus includes a means for determining that the measured signal data is not indicative of the hover event in response to the correlation coefficient not exceeding the hover threshold.

In an embodiment of the techniques presented herein, a non-transitory machine-readable storage medium including machine executable code is provided. The machine executable code causes a machine to construct a Gaussian distribution using measured signal data detected by a sensor array of a device. The machine executable code causes the machine to calculate a Pearson correlation coefficient between the Gaussian distribution and a measured signal profile of the measured signal data, wherein the Pearson correlation coefficient represents a similarity between the Gaussian distribution and the measured signal profile. The machine executable code causes the machine to detect a hover event of an object with respect to the sensor array in response to the Pearson correlation coefficient exceeding a hover threshold. The machine executable code causes the machine to determine that the measured signal data is not indicative of the hover event in response to the Pearson correlation coefficient not exceeding the hover threshold.

In an embodiment of the techniques presented herein, a system is provided. The system includes a sensor array of sensors configured to measure capacitance signal values as sets of measured signal data. The system includes a hover detection module configured to receive a set of measured signal data detected by the sensor array. The hover detection module creates a generated representation from the set of measured signal data. The hover detection module compares the generated representation with a measured representation of the set of measured signal data to create a correlation coefficient corresponding to a correlation between the generated representation and the measured representation of the set of measured signal data. The hover detection module detects a hover event of an object hovering relative to the sensor array in response to the correlation coefficient exceeding a hover threshold. The hover detection module determines that the set of measured signal data is not indicative of the hover event in response to the correlation coefficient not exceeding the hover threshold.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 2 is a component block diagram illustrating a kiosk including a hover detection module for detecting hover events in accordance with at least some of the techniques presented herein.

DETAILED DESCRIPTION

Figure 1A:
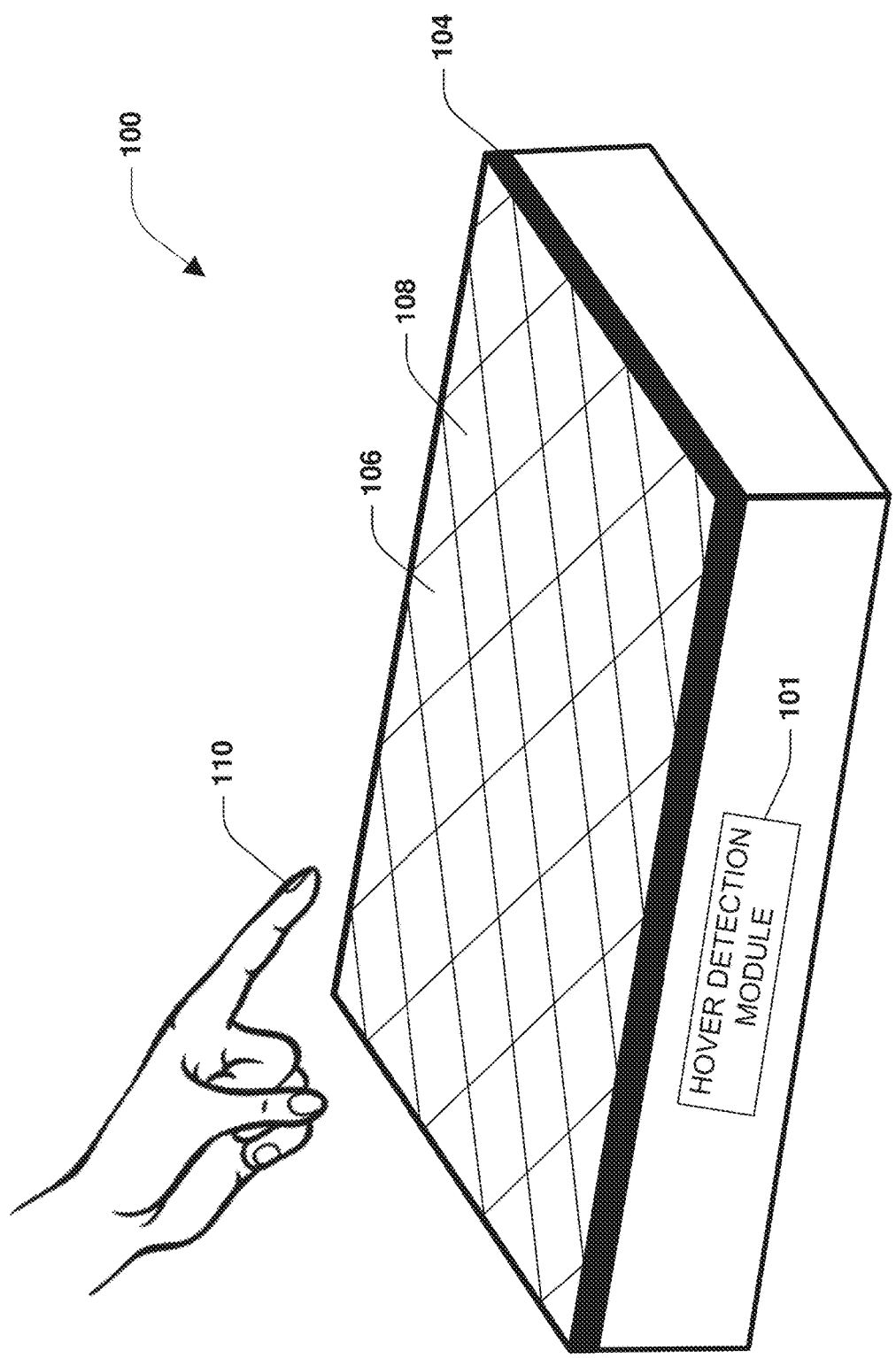
FIG. 1A is a component block diagram illustrating a device including a hover detection module for detecting hover events in accordance with at least some of the techniques presented herein.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Systems and methods are provided for improved hover detection for touchscreens. Many touchscreens support user input through hover gestures. These touchscreens may utilize intelligent touchless human-machine interfaces (HMIs) or other touchless technology to detect touchless input. Conventional hover detection techniques have several disadvantages. Conventional hover detection techniques suffer from poor signal-to-noise ratios because a user may be hovering (e.g., with a finger) over the touchscreen as part of a hover gesture, but does not touch the touchscreen. Any detected useful signal is low, compared to if the user touched the touchscreen, because the finger may be far from the touchscreen, thus reducing capacitive coupling with the electrodes. Conventional hover detection techniques have limited position detection accuracy (e.g., an inability to detect an accurate position of the finger), low linearity (e.g., a deviation of a registered hover gesture from an actual location of the finger as the finger is moved horizontally, vertically, or diagonally along a line), and suffer from jittering. Conventional hover detection techniques are negatively impacted by temperature changes, external noise, and spurious objects (e.g., a coffee mug set on a touchscreen, rain, dirt, etc.) that can result in false positives (e.g., detecting a hover event when there is no user hovering over the touch screen). Thus, conventional hover detection techniques are susceptible to false hover detection due to temperature changes or external noises, are limited to small hover distance detection (e.g., limited to 10 mm or shorter hover distances), lack water rejection techniques, lack real-time baseline recovery functionality (e.g., lack the ability to update a baseline capacitance of sensors in real-time), and have poor accuracy and linearity due to non-optimal position calculation techniques, significant noise, and substantial signal mismatches.

Accordingly, as provided herein, the disclosed hover detection technique overcomes the technical problems of conventional hover detection techniques and improves the functional operation of touchscreens and devices that utilize touchscreens. This improvement is provided by a hover detection module that can accurately determine whether measured signal data (e.g., response signals corresponding to capacitance values measured by sensors of a sensor array) is or is not indicative of a hover event (e.g., a finger hovering over a touchscreen). In particular, when the hover detection module receives the measured signal data from the sensor array, the hover detection module creates a generated representation (e.g., a best-fit Gaussian distribution/curve) constructed from the measured signal data. The generated representation may represent ideal/expected response signals that would be detected by the sensor array for a real/actual hover event. The measured signal data may be represented by a measured representation of the measured signal data (e.g., a curve representing the response signals detected by each sensor). In this way, the measured representation is a direct representation of the measured signal data detected by the sensor array. In some embodiments, the measured signal data may be pre-processed before the creation of the measured representation and the generated representation (e.g., filtered to remove noise, diffed with respect to a baseline of the sensor array, extended to fill in missing measurements, modified using virtual sensors for measured signal data near an edge of the touchscreen, etc.).

The hover detection module compares the measured representation to the generated representation to create a correlation coefficient indicating how similar the measured representation is to the generated representation (e.g., how similar are the two curves, such as through curve fitting). Thus, the correlation coefficient indicates a degree of similarity between of the measured representation to the generated representation (e.g., values between 0 and 1 such as where 0.53 is a low similarity and 0.95 is a high similarity). The larger the correlation coefficient, the more similar the measured representation is to the generated representation.

Figure 4:
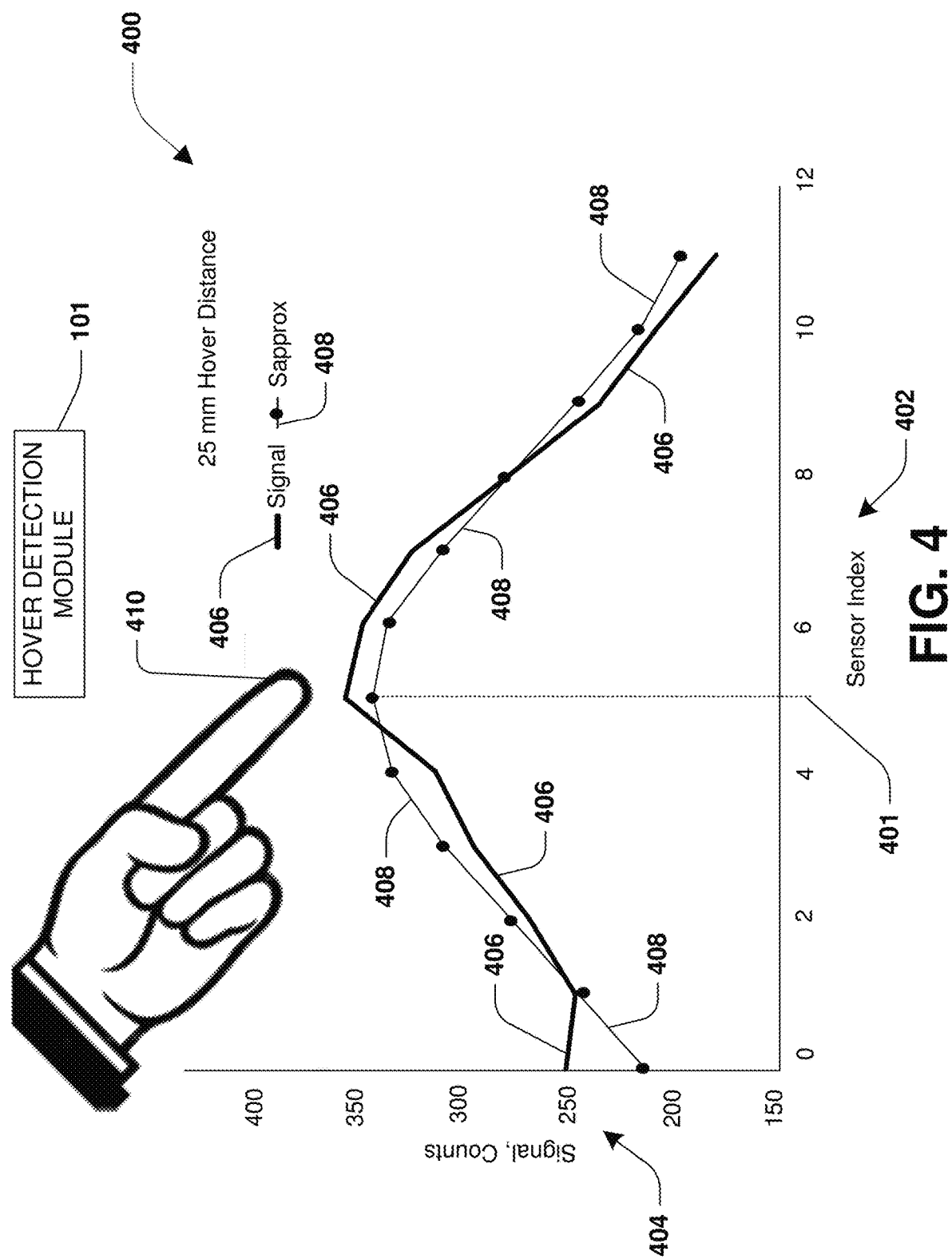
FIG. 4 is an illustration of an example of a chart illustrating information used by a hover detection module for detecting hover events in accordance with at least some of the techniques presented herein.
Figure 5:
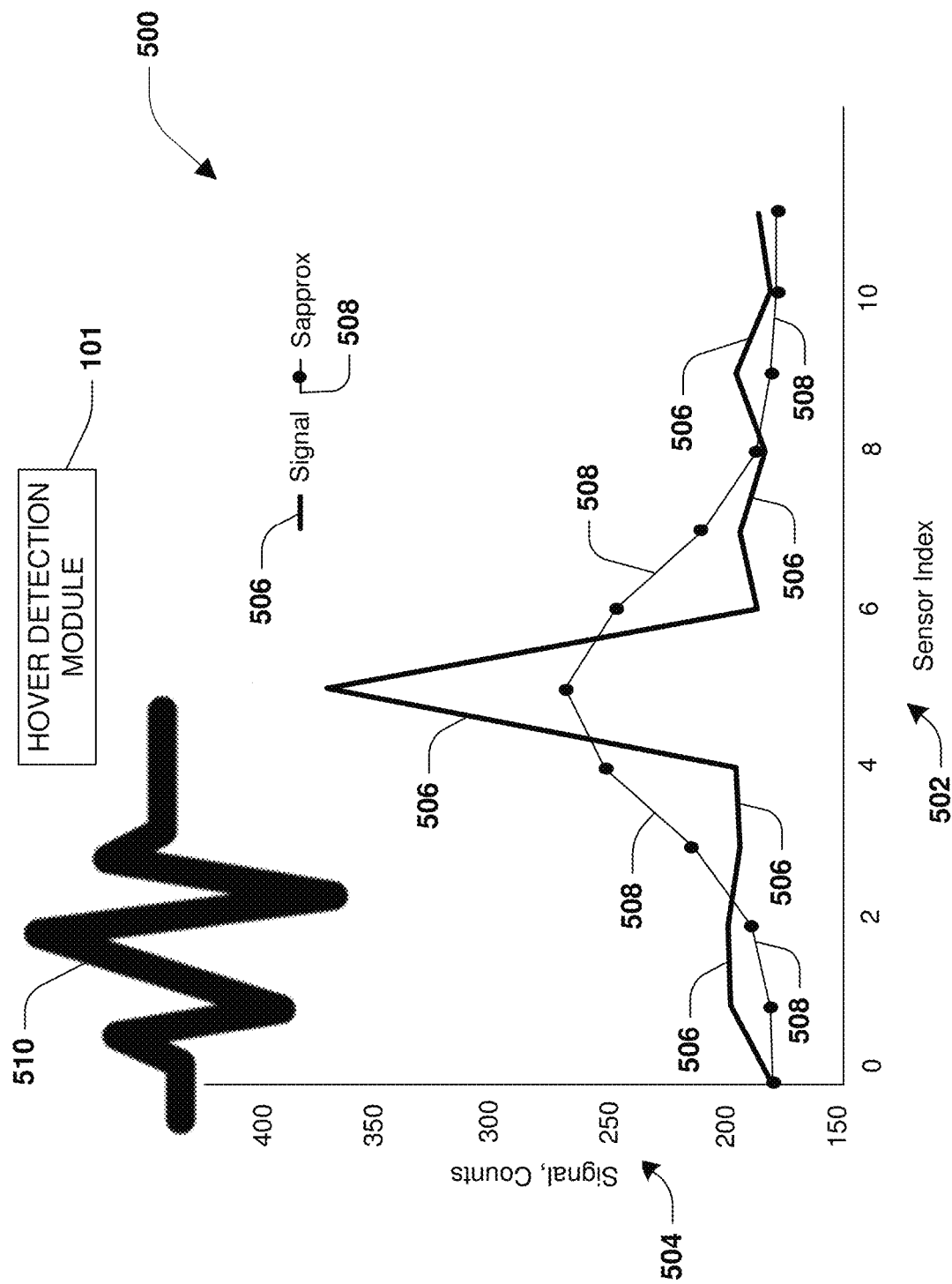
FIG. 5 is an illustration of an example of a chart illustrating information used by a hover detection module for detecting hover events in accordance with at least some of the techniques presented herein.

The generated representation, such as a best-fit Gaussian distribution/curve, is a representation of what expected response signals would be detected by the sensor array if there is an actual hover event and not merely noise. That is, the bell-shaped curve of the generated representation reflects how a sensor underneath a finger hovering over the sensor array would detect a largest response signal, while other sensors would detect decreasingly smaller response signals the further away from the sensor detecting the largest response signal. As will be described in further detail, FIG. 4 illustrates an embodiment of a generated representation 408 having the bell-shaped curve. The larger the correlation coefficient, and thus the more similar the measured representation (e.g., the actual measured response signals detected by the sensor array) is to the generated representation (e.g., response signals that would be ideal/expected for an actual/real hover event), the more likely the measured signal data is indicative of an actual/real hover event and not noise. The embodiment of FIG. 4 illustrates an embodiment of a large correlation coefficient (e.g., 0.95) indicative of an actual/real hover event where a measured representation 406 has high similarity to the generated representation 408. As will be described in further detail, FIG. 5 illustrates an embodiment of a small correlation coefficient (e.g., 0.65) indicating that there is no actual/real hover event, but instead corresponds to noise (e.g., unwanted and/or unknown modifications that a signal may experience during capture, storage, transmission, processing, and/or conversion), where a measured representation 506 having a spiked shape has low similarity to a generated representation 508 having the bell shaped curve.

If the correlation coefficient exceeds a hover threshold, then a hover event is detected. Position detection and filtering is performed to identify a position of the hover event. In this way, the hover event and the position of the hover event is provided to the device. This may cause the device to perform a particular operation or command based upon the hover event and the position (e.g., invoke functionality of a user interface element that was hovered over by a user). If the correlation coefficient does not exceed the hover threshold, then no hover event is detected.

This hover detection technique improves the precision of detecting actual/real hover events, distinguishing the actual/real hover events from noise, and reduces false positives. Improving hover detection improves the functional operation of devices (e.g., kiosks, industrial panels, multi-function prints, touchscreen/touch panels, and/or a wide variety of other devices and computers that support hover gesture input) that can now operate based upon precise and accurate user input. This hover detection technique improves signal-to-noise ratios, improves position detection accuracy, improves linearity, and reduces jittering. This hover detection technique is not susceptible to false hover detection from temperature changes or external noises, and supports must larger hover detection distances (e.g., hover detection distances much larger than 10 mm) compared to conventional hover detection techniques. These improvements are enabled because the generated representation is constructed (e.g., in real-time) from the measured signal data, and the coefficient is determined and compared to the hover threshold in order to more precisely determine whether a hover event actually occurred.

FIG. 1A is a component block diagram illustrating a device 100 including a hover detection module 101 for detecting hover events in accordance with at least some of the techniques presented herein. The device 100 may correspond to an electronic device that supports hover and/or touch gestures (e.g., a tablet, a printer, an industrial panel, a security panel, a kiosk, etc.). The device 100 may include a processor, memory, persistent storage, network communication functionality, firmware, a display (e.g., a touch panel or touchscreen), and/or other hardware or software whose functional operation is improved by the disclosed hover detection techniques provided herein. The device 100 may host the hover detection module 101 configured to implement the disclosed hover detection techniques provided herein (e.g., the hover detection module 101 may be implemented through firmware and/or execute functionality using a processor of the device 100). The device 100 may include a sensor array 104 used for detecting hover and touch gestures. The sensor array 104 comprises a plurality of sensors (e.g., electrodes), such as a sensor 106, a sensor 108, and/or other sensors.

The sensors of the sensor array 104 are configured to measure capacitance values (e.g., response signals) as measured signal data. A sensor may measure a capacitance value that includes a baseline capacitance (e.g., a parasitic capacitance of the sensor itself) and any additional capacitance detected by the sensor (e.g., capacitance of a finger 110). The closer the finger 110 is to the sensor, the larger the capacitance value that will be measured by the sensor for inclusion within the measured signal data. In some embodiments, the sensor array 104 is a self-capacitance sensor array. In other embodiments, the sensor array 104 is a mutual capacitance sensor array. As will be subsequently discussed in further detail, the hover detection module 101 is configured to receive and process the measured signal data detected by the sensor array 104 in order to accurately detect whether the measured signal data is indicative of an actual/real hover event or not, which may be performed in real-time during operation of the sensor array 104 and the device 100.

Figure 1B:
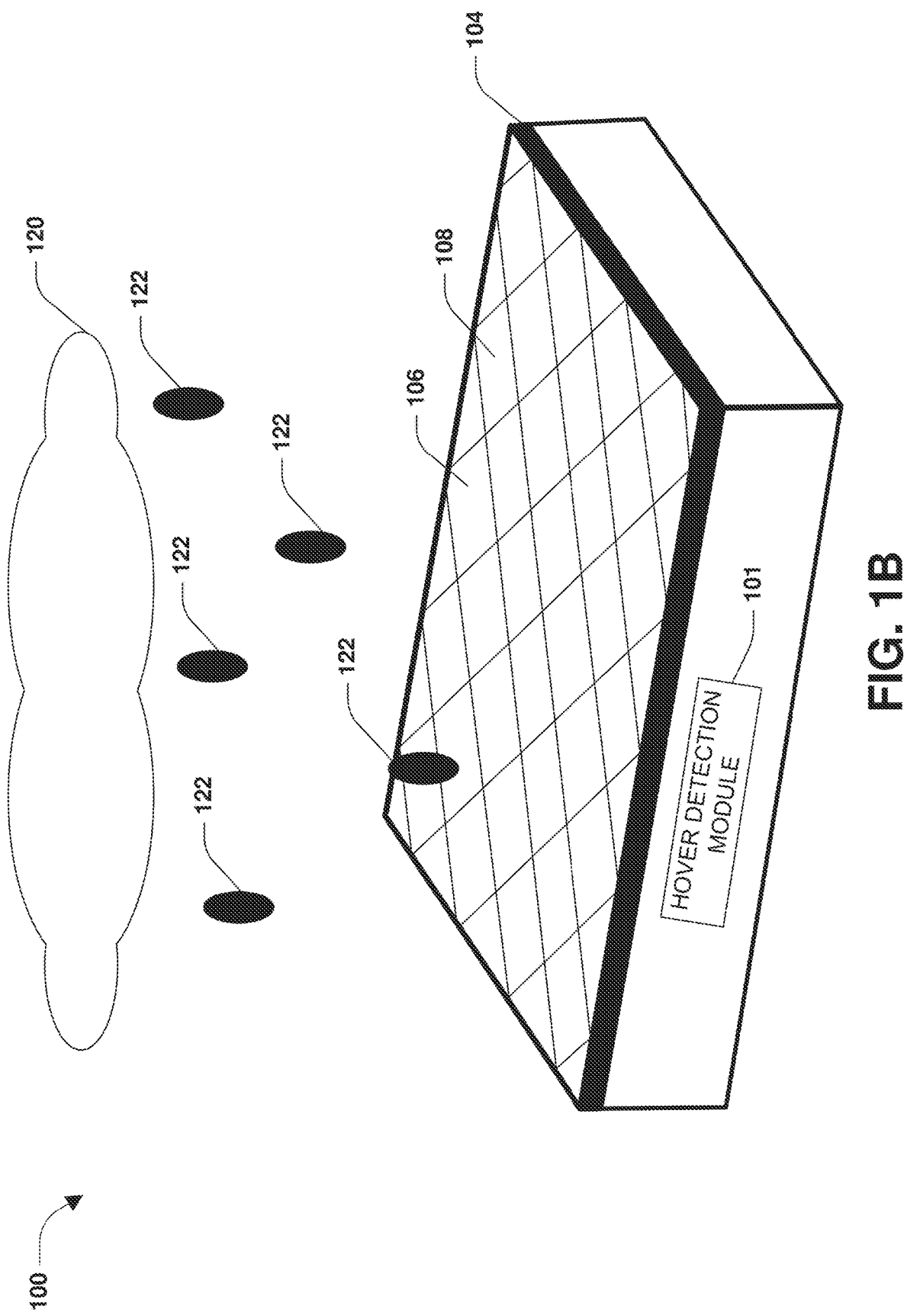
FIG. 1B is a component block diagram illustrating a device including a hover detection module for detecting hover events in accordance with at least some of the techniques presented herein.

The hover detection module 101 is able to accurately identify when the measured signal data is not indicative of a hover event in order to reduce false positives. In some embodiments, the measured signal data is generated by the sensor array 104 during a weather event such as when a cloud 120 is raining 122 on the sensor array 104, as illustrated by FIG. 1B. Conventional hover detection techniques would be unable to determine that the measured signal data does not correspond to a hover event, but is instead a noisy response signal due to the rain 122. In contrast, the hover detection module 101 is able to determine that the measured signal data does not correspond to a hover event by creating a generated representation constructed from the measured signal data, comparing a measured representation of the measured signal data to the generated representation to create a correlation coefficient indicative of a similarity between the representations, and detecting the hover event or not based upon whether the correlation coefficient exceeds a hover threshold. Because the measured signal data is a result of the rain 122, the measured representation (e.g., a curve with a sharp spike where the rain 122 has touched the sensor array 104) will be dissimilar from the generated representation (e.g., a bell curve shape of a best-fit Gaussian distribution/curve), and thus the correlation coefficient will be small and not exceed the hover threshold.

It may be appreciated that the hover detection module 101 may be implemented for a wide variety of devices. In some embodiments, the hover detection module 101 may be implemented for a kiosk 200, as illustrated by FIG. 2. The kiosk 200 may execute hover detection functionality of the hover detection module 101 through firmware, a processor, memory, and/or other hardware and/or software resources of the kiosk 200. The kiosk 200 includes a display 202 such as a touch panel with a sensor array for detecting hover and/or touch inputs. The hover detection module 101 improves the operation of the kiosk 200 by reducing false positive inputs and increasing the accuracy of detecting hover inputs and the positions of the hover inputs. This prevents the kiosk 200 from otherwise incorrectly/needlessly invoking functionality (e.g., printing a receipt based upon dirt, rain, or a coffee mug falsely detected as a hover gesture for a print user interface element) that was not invoked by a user through hover input.

Figure 3:
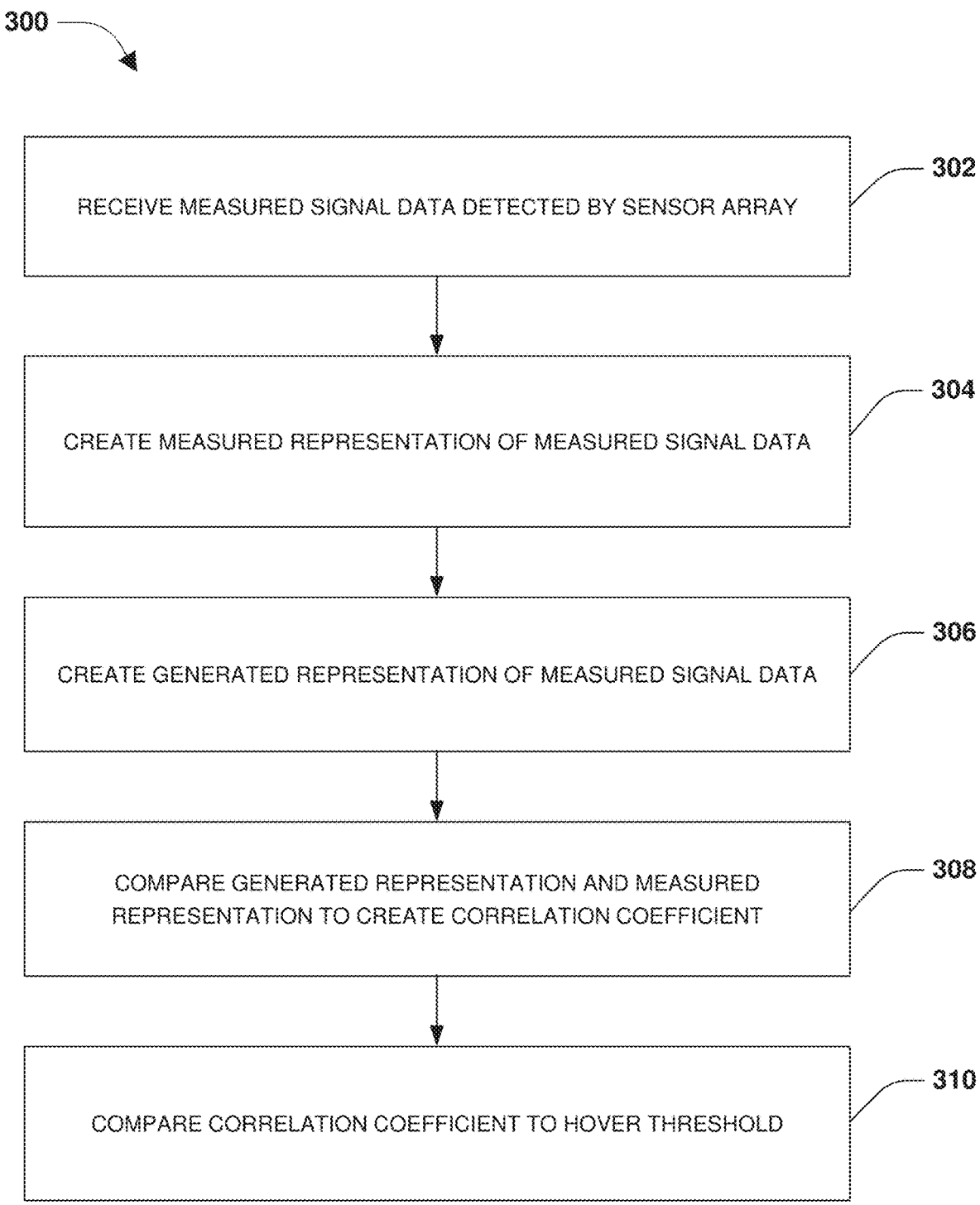
FIG. 3 is an illustration of an example method for detecting hover events for touchscreens in accordance with at least some of the techniques presented herein.

FIG. 3 is an illustration of an example method 300 for detecting hover events for touchscreens in accordance with at least some of the techniques presented herein. In some embodiments, the method 300 may be implemented by the hover detection module 101 in order to improve the accuracy and functional operation of touchscreens and devices using the touchscreens. During operation 302 of method 300, the hover detection module 101 receives measured signal data detected by a sensor array of a device. In some embodiments, the measured signal data may comprise capacitive values (response signals, counts) measured by the sensors of the sensor array.

In some embodiments, the hover detection module 101 may perform pre-processing on the measured signal data. In some embodiments, the measured signal data is filtered to remove noise from the measured signal data to create filtered measured signal data. The filtering is performed to improve a signal-to-noise ratio (SNR). Because the sensors of the sensor array may have a baseline capacitance (e.g., a parasitic capacitance) that can drift/change over time, a baseline update may be performed for the sensor array to create baseline sensor information. The baseline sensor information may be used to modify the filtered measured signal data to create modified measured signal data (also referred to as diff measured signal data). In particular, the baseline sensor information may be subtracted from the filtered measured signal data to create the modified measured signal data so that the modified measured signal data does not take into account the baseline/parasitic capacitance present within the sensors. In this way, residual signals are eliminated after a hover event ends (e.g., a finger is no longer hovering over the sensor array), false hover stuck events are prevented, and signals from temperature drift are compensated for by performing the baseline update. The modified measured signal data can be used to generate a measured representation (a measured signal profile of response signals) of the modified signal data.

The hover detection module 101 may perform other pre-processing for the measured signal data. In some embodiments of performing the pre-processing, the hover detection module 101 identifies a first set of sensors that detected a subset of the measured signal data. The hover detection module 101 identifies a second set of sensors that did not detect the measured signal data. The hover detection module 101 forms an extended vector of the measured signal data in order to associate measured values for the second set of sensors. The extended vector is formed by mirroring the subset of the measured signal data as mirrored signal data for association with the second set of sensors. In this way, the extended vector can be used to generate a measured representation (a measured signal profile of response signals) of the modified signal data. In some embodiments of performing the pre-processing, the measured signal data may be identified as being detected by a threshold number of edge sensors of the sensor array (e.g., a finger may be hovering near an edge of the sensor array). Accordingly, one or more virtual sensors are calculated with virtual sensor signal data to include within the measured signal data (e.g., virtual sensors that would be virtually positioned beyond the edge of the sensor array).

During operation 304 of method 300, the measured representation of the measured signal data is created. The measured representation is a representation of the response signals as measured by the sensors of the sensor array, which may take into account any pre-processing that was performed.

During operation 306 of method 300, a generated representation is constructed from the measured signal data. The generated representation is an ideal/expected representation of what response signals would be detected by the sensors for an actual/real hover event. In some embodiments, the generated representation is a Gaussian distribution (e.g., a best-fit Gaussian curve having a bell shape). The generated representation may have a bell shape of measured capacitance values for sensors along a dimension of the sensor array. In another embodiment, a two-dimensional bell-shaped curve may be constructed from the measured data. In this embodiment, mutual capacitance values may be used. For both one- and two-dimensional curves based on self- or mutual capacitance, the largest capacitance value (e.g., a maximum of the bell shape) would correspond to a sensor closest to where an actual/real finger (or other object or body part) would be located for an actual/real hover event, along with increasingly smaller capacitance values for sensors to either side of that sensor. In some embodiments, the generated representation is constructed in real-time during operation of the sensor array detecting objects proximate a display of the device. In some embodiments, the generated representation corresponds to a generated curve constructed from the measured signal data (e.g., a data structure mapping sensors to ideal/expected response signals of capacitance values that would reflect what the sensors would detect for a real/actual hover event), and the measured representation comprises a measured curve corresponding to a plot of the measured signal data (e.g., stored as a data structure mapping sensors to response signals of capacitance values measured by each sensor). In this way, a similarity between the generated curved and the measured curve can be determined (e.g., by curve fitting) to create a correlation coefficient indicative of a similarity between the generated curved and the measured curve.

In some embodiments of constructing the generated representation, the hover detection module 101 evaluates the measured signal data (measured signal profile) using a shape criterion and/or a mass criterion. The criteria are used to identify a candidate for a global maximum search for identifying a global maximum value of the measured signal data (e.g., a value within the measured signal data that can be used as a maximum value of the generated representation, such as a maximum value of the bell curve). The candidate for the global maximum is determined as an index of a sensor with a largest mass of response signals around the sensor using the mass criterion and shape criterion as constraints.

During operation 308 of method 300, the generated representation and the measured representation are compared to create a correlation coefficient corresponding to a correlation (similarity) between the generated representation and the measured representation. In some embodiments, the correlation coefficient is calculated as a Pearson correlation coefficient between the generated representation (a Gaussian distribution) and the measured representation (a measured signal profile). The larger the correlation coefficient (e.g., the closer to 1 on a scale of 0 to 1), the more similar the measured representation, corresponding the measured signal data detected by the sensor array, is to the generated representation corresponding to an ideal/expected representation of what response signals would be detected by the sensor array for an actual/real hover event. Thus, the larger the correlation coefficient, the more likely the measured representation, of the measured signal data detected by the sensor array, is indicative of a hover event and not noise.

During operation 310 of method 300, the correlation coefficient may be compared to a hover threshold (e.g., 0.82) to determine whether the measured signal data is indicative of a hover event. If the correlation efficient exceeds the hover threshold, then a hover event is detected. In response to detecting the hover event, position filtering may be performed using the measured signal data to determine a hover position of the hover event. Performing the position filtering improves accuracy, linearity, and jitter. In some embodiments, the hover detection module 101 calculates the hover position of the hover event as a vertex of the generated representation, an embodiment of which is illustrated as hover position 401 of FIG. 4. The hover detection module 101 may transmit a signal to the device (e.g., to a processor of a kiosk) to indicate that the hover event occurred and the hover position of the hover event. The device may evaluate the hover event and the hover position to determine if an operation should be executed (e.g., the user hovered over a scan user interface element, and thus a scan operation is performed by the kiosk).

If the correlation coefficient does not exceed the hover threshold, then a determination is made that the measured signal data is not indicative of a hover event. In some embodiments, the hover detection module 101 determines that the measured signal data is indicative of noise. In some embodiments, the hover detection module 101 may determine a proximity of an object detected by the sensor array as the measured signal data if the hover event is not detected. The proximity may be transmitted to the device.

FIG. 4 is an illustration of an example of a chart 400 illustrating information used by the hover detection module 101 for detecting hover events in accordance with at least some of the techniques presented herein. The chart 400 represents data used by the hover detection module 101 for detecting hover events. This data may be stored within various data structures by the hover detection module 101 such as within memory or persistent storage. The chart 400 includes an x-axis 402 representing sensors along a dimension of a sensor array (e.g., sensors 0 through 11). The chart includes a y-axis 404 representing response signals (or counts) measured by the sensors of the sensor array. The response signals may correspond to capacitance values measured by the sensors. The response signals may be provided to the hover detection module 101 as measured signal data for processing.

The chart 400 depicts a measured representation 406 of the measured signal data (e.g., a curve representing response signals measured by the sensors). In some embodiments, the measured representation 406 may represent the measured signal data after pre-processing, such as after filtering, baselining, and/or other pre-processing.

The chart 400 depicts a generated representation 408 constructed from the measured signal data. The generated representation 408 represents ideal/expected response signals that would be measured by the sensor array if there was an actual/real hover event. The generated representation 408 may comprise a Gaussian distribution/curve that has as bell shape. A maximum value of the generated representation 408 corresponds to a sensor that would have a largest response signal (e.g., a sensor directly underneath a finger 410). From that sensor, the ideal/expected response signals would taper off the further away a sensor is from that sensor, thus defining the bell shape.

The generated representation 408 and the measured representation 406 are compared to determine a correlation coefficient. Because the shape of the measured representation 406 is very similar to the bell shape of the generated representation 408, the correlation coefficient may have a large value (e.g., 0.94 on a scale of 0 to 1.0). The correlation coefficient may exceed a hover threshold (e.g., 0.74), and thus a hover event may be detected. In some embodiments, the hover detection module 101 calculates a hover position 401 of the hover event as a vertex of the generated representation 408.

FIG. 5 is an illustration of an example of a chart 500 illustrating information used by the hover detection module 101 for detecting hover events in accordance with at least some of the techniques presented herein. The chart 500 represents data used by the hover detection module 101 for detecting hover events. This data may be stored within various data structures by the hover detection module 101 such as within memory or persistent storage. The chart 500 includes an x-axis 502 representing sensors along a dimension of a sensor array (e.g., sensors 0 through 11). The chart includes a y-axis 504 representing response signals (or counts) measured by the sensors of the sensor array. The response signals may correspond to capacitance values measured by the sensors. The response signals may be provided to the hover detection module 101 as measured signal data for processing.

The chart 500 depicts a measured representation 506 of the measured signal data (e.g., a curve representing response signals measured by the sensors). In some embodiments, the measured representation 506 may represent the measured signal data after pre-processing, such as after filtering, baselining, and/or other pre-processing.

The chart 500 depicts a generated representation 508 constructed from the measured signal data. The generated representation 508 represents ideal/expected response signals that would be measured by the sensor array if there was an actual/real hover event. The generated representation 508 may comprise a Gaussian distribution/curve that has as bell shape. A maximum value of the generated representation 508 corresponds to a sensor that would have a largest response signal (e.g., a sensor directly underneath a finger). From that sensor, the ideal/expected response signals would taper off the further away a sensor is from that sensor, thus defining the bell shape.

The generated representation 508 and the measured representation 506 are compared to determine a correlation coefficient. Because the shape of the measured representation 506 is very dissimilar to the bell shape of the generated representation 508, the correlation coefficient may have a small value (e.g., 0.54 on a scale of 0 to 1.0). Because the correlation coefficient may not exceed a hover threshold (e.g., 0.74), the hover detection module 101 may determine that a hover event was not detected, but instead noise 510 was detected.

Figure 6:
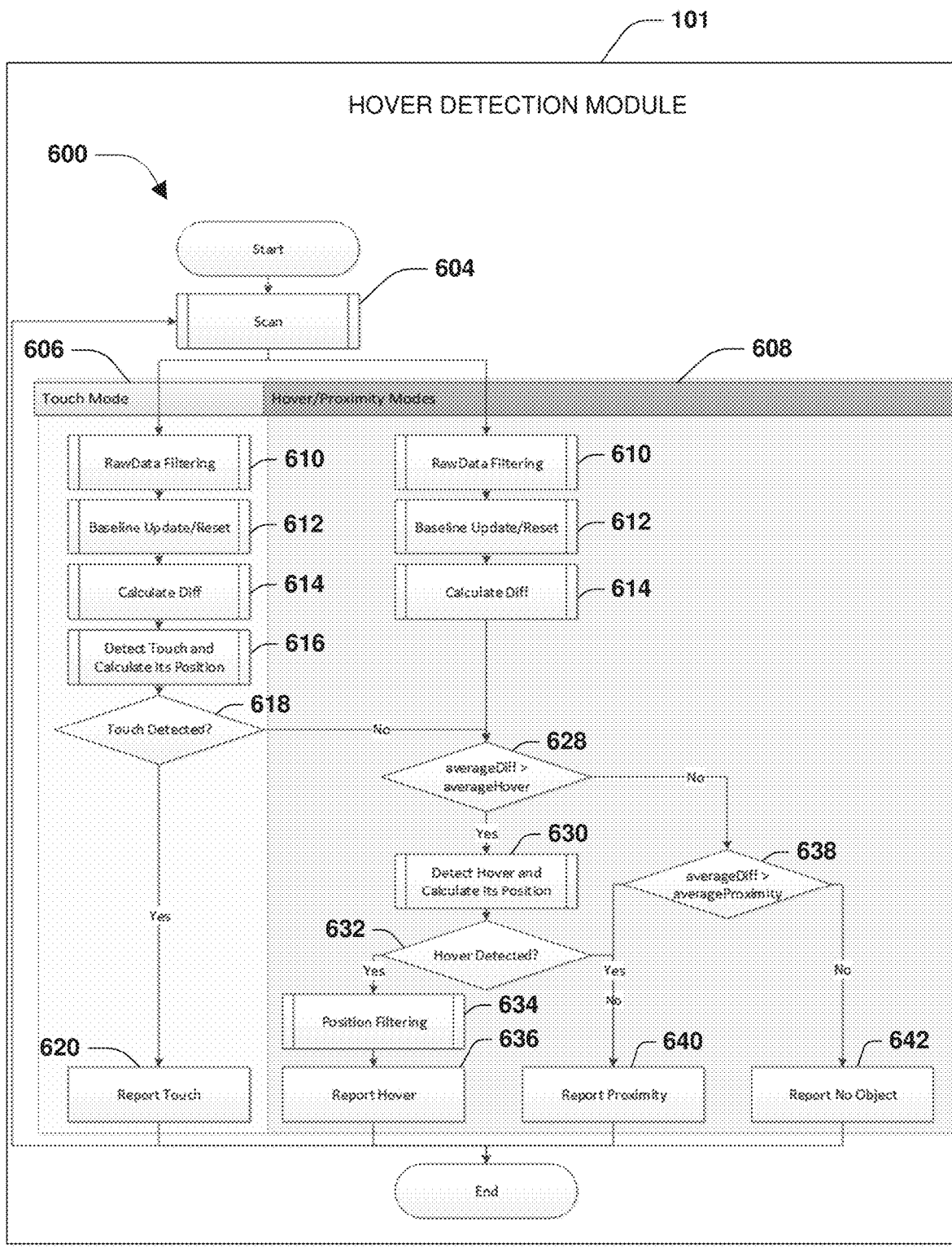
FIG. 6 is an illustration of an example method for detecting hover events for touchscreens in accordance with at least some of the techniques presented herein.

FIG. 6 is an illustration of an example method 600 for detecting hover events for touchscreens in accordance with at least some of the techniques presented herein. The hover detection module 101 may be configured to execute the method 600 in order to perform hover event detection, touch event detection, and/or proximity detection for a device associated with a touchscreen. The hover detection module 101 may either be in a touch mode 606 or a hover/proximity mode 608, and may switch between the modes. A sensor array of the device may perform a scan 604 to create measured signal data of response signals detected by sensors of the sensor array.

Regardless of whether the hover detection module 101 is in the touch mode 606 or the hover/proximity mode 608, the hover detection module 101 may perform optional pre-processing upon the measured signal data. The pre-processing may include raw data filtering 610 to remove noise from the measured signal data in order to improve signal to noise ratio and remove noise that could falsely trigger hover detection. The pre-processing may include a baseline update/reset 612 that updates/resets baseline sensor information (e.g., updates baseline/parasitic capacitance values of the sensors). The pre-processing may include a difference operation 614 that calculates a difference between the measured signal data (filtered measured signal data) and the baseline sensor information to create diff measured signal data (also referred to as modified measured signal data) where the baseline sensor information has been removed from the measured signal data.

If the hover detection module 101 is in the touch mode 606, then touch detection functionality 616 is executed to detect 618 whether a touch event has been detected and a position of the touch event. If the touch event is detected, then the touch event and a position of the touch event are reported 620 to the device. If the touch event is not detected, then the hover detection module 101 may transition from the touch mode 606 to the hover/proximity mode 608.

Regardless of whether the hover detection module 101 transitioned to the hover/proximity mode 608 because a touch event was not detected or the hover detection module 101 was already in the hover/proximity mode 608 and completed the optional pre-processing of the measured signal data, an average of the diff measured signal data is compared 628 to an average hover threshold. If the average of the diff measured signal data does not exceed the average hover threshold, then no hover event is detected and proximity detection may be performed. As part of the proximity detection, the average of the diff measured signal data is compared 638 to an average proximity threshold. If the average of the diff measured signal data does not exceed the average proximity threshold, then the hover detection module 101 reports 642 to the device that no object was detected. If the average of the diff measured signal data exceeds the average proximity threshold, then the hover detection module 101 reports 640 a proximity of a detected object to the device.

If the average of the diff measured signal data exceeds the average hover threshold based upon comparison 628, then hover event and position detection 630 is executed to determine 632 whether a hover event is detected. The hover event and position detection 630 may include creating a measured representation of the diff measured signal data, creating a generated representation constructed from the diff measured signal data, comparing the measured representation to the generated representation to create a correlation coefficient that is compared to a hover threshold to determine whether a hover event is detected. If the hover event is not detected, then the hover detection module 101 reports 640 the proximity of the detected object to the device. If the hover event is detected, then position filtering 634 is performed to determine a hover position of the hover event. In this way, the hover event and hover position are reported 636 to the device.

Figure 7:
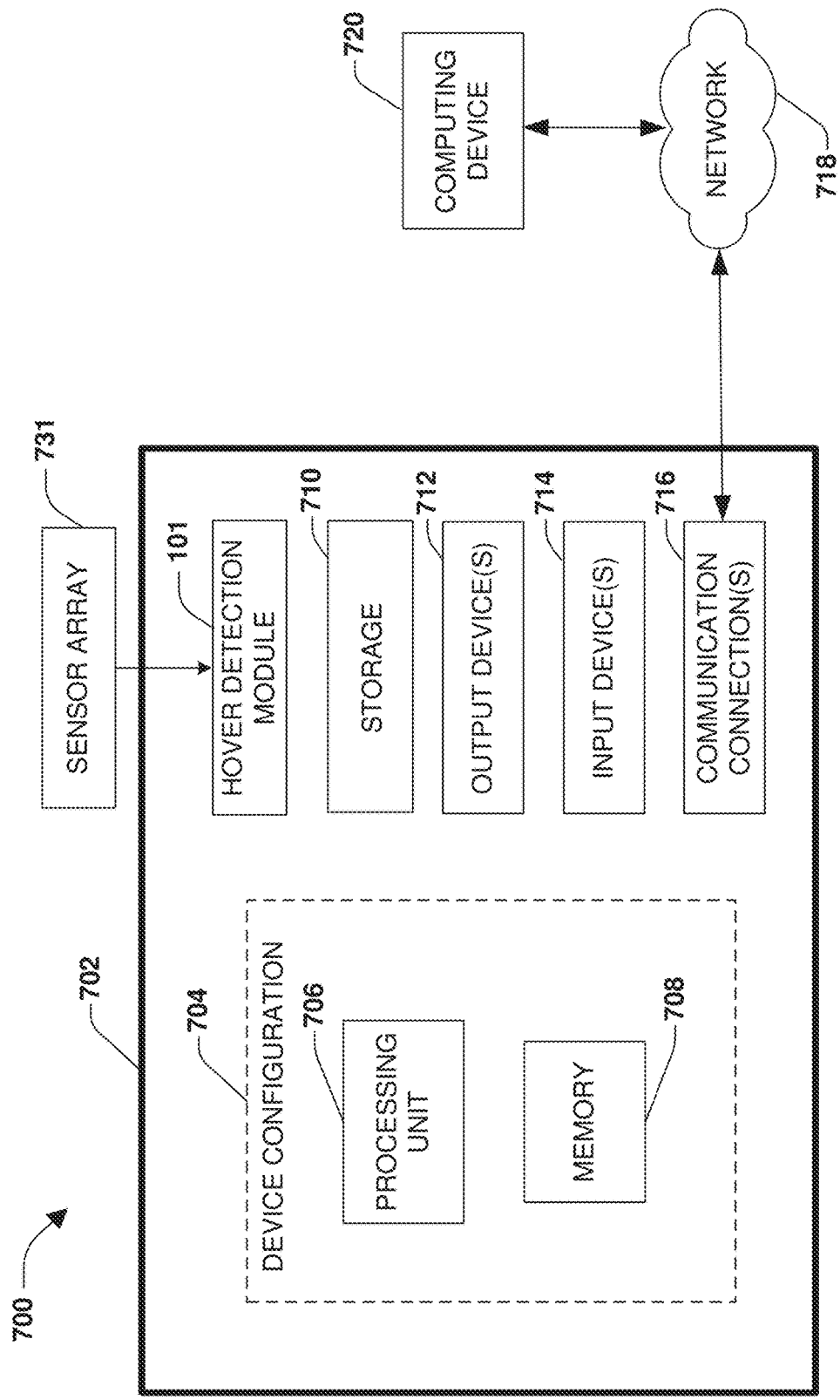
FIG. 7 illustrates an exemplary computing environment wherein one or more of the provisions set forth herein may be implemented in accordance with at least some of the techniques presented herein.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, without limitation, personal computers, server computers, hand-held or laptop devices, mobile devices (such as mobile phones, Personal Digital Assistants (PDAs), media players, and the like), kiosks, touch panel displays, printers, industrial panels, low-resolution icon-based touchscreens, multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example 700 of a system comprising a computing device 702 configured to implement one or more embodiments provided herein. In one configuration, computing device 702 includes a processing unit 706 and memory 708. Depending on the exact configuration and type of computing device, memory 708 may be volatile (such as RAM, for example), non-volatile (such as ROM, flash memory, etc., for example), or some combination of the two. This configuration is illustrated in FIG. 7 by dashed line 704.

As provided herein, the computing device 702 includes a hover detection module 101 configured to determine whether measured signal data detected by a sensor array 731 is indicative of a hover event or not indicative of the hover event (e.g., indicative of noise).

In some embodiments, device 702 may include additional features and/or functionality. For example, device 702 may also include additional storage (e.g., removable and/or non-removable) including, without limitation, magnetic storage, optical storage, and the like. Such additional storage is illustrated in FIG. 7 by storage 710. In one embodiment, computer readable instructions to implement one or more embodiments provided herein may be in storage 710. Storage 710 may also store computer readable instructions to implement an operating system, an application program, and the like. Computer readable instructions may be loaded in memory 708 for execution by processing unit 706, for example.

The term "computer readable media" as used herein includes computer storage media. Computer storage media includes volatile and nonvolatile, removable and non-removable media implemented in any method or technology for storage of information such as computer readable instructions or other data. Memory 708 and storage 710 are examples of computer storage media. Computer storage media includes, without limitation, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 702. Any such computer storage media may be part of device 702.

Device 702 may also include communication connection(s) 716 that allows device 702 to communicate with other devices. Communication connection(s) 716 may include, without limitation, a modem, a Network Interface Card (NIC), an integrated network interface, a radio frequency transmitter/receiver, an infrared port, a USB connection, or other interfaces for connecting device 702 to other computing devices. Communication connection(s) 716 may include a wired connection or a wireless connection. Communication connection(s) 716 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 702 may include input device(s) 714 such as keyboard, mouse, pen, voice input device, touch input device, infrared cameras, video input devices, and/or any other input device. Output device(s) 712 such as one or more displays, speakers, printers, and/or any other output device may also be included in device 702. Input device(s) 714 and output device(s) 712 may be connected to device 702 via a wired connection, wireless connection, or any combination thereof. In one embodiment, an input device or an output device from another computing device may be used as input device(s) 714 or output device(s) 712 for computing device 702.

Components of device 702 may be connected by various interconnects, such as a bus. Such interconnects may include a Peripheral Component Interconnect (PCI), such as PCI Express, a Universal Serial Bus (USB), Firewire (IEEE 794), an optical bus structure, and the like. In an embodiment, components of device 702 may be interconnected by a network. For example, memory 708 may be comprised of multiple physical memory units located in different physical locations interconnected by a network.

Those skilled in the art will realize that storage devices utilized to store computer readable instructions may be distributed across a network. For example, a computing device 720 accessible via network 718 may store computer readable instructions to implement one or more embodiments provided herein. Computing device 702 may access the computing device 720 and download a part or all of the computer readable instructions for execution. Alternatively, computing device 702 may download pieces of the computer readable instructions, as needed, or some instructions may be executed at computing device 702 and some at computing device 720.

Figure 8:
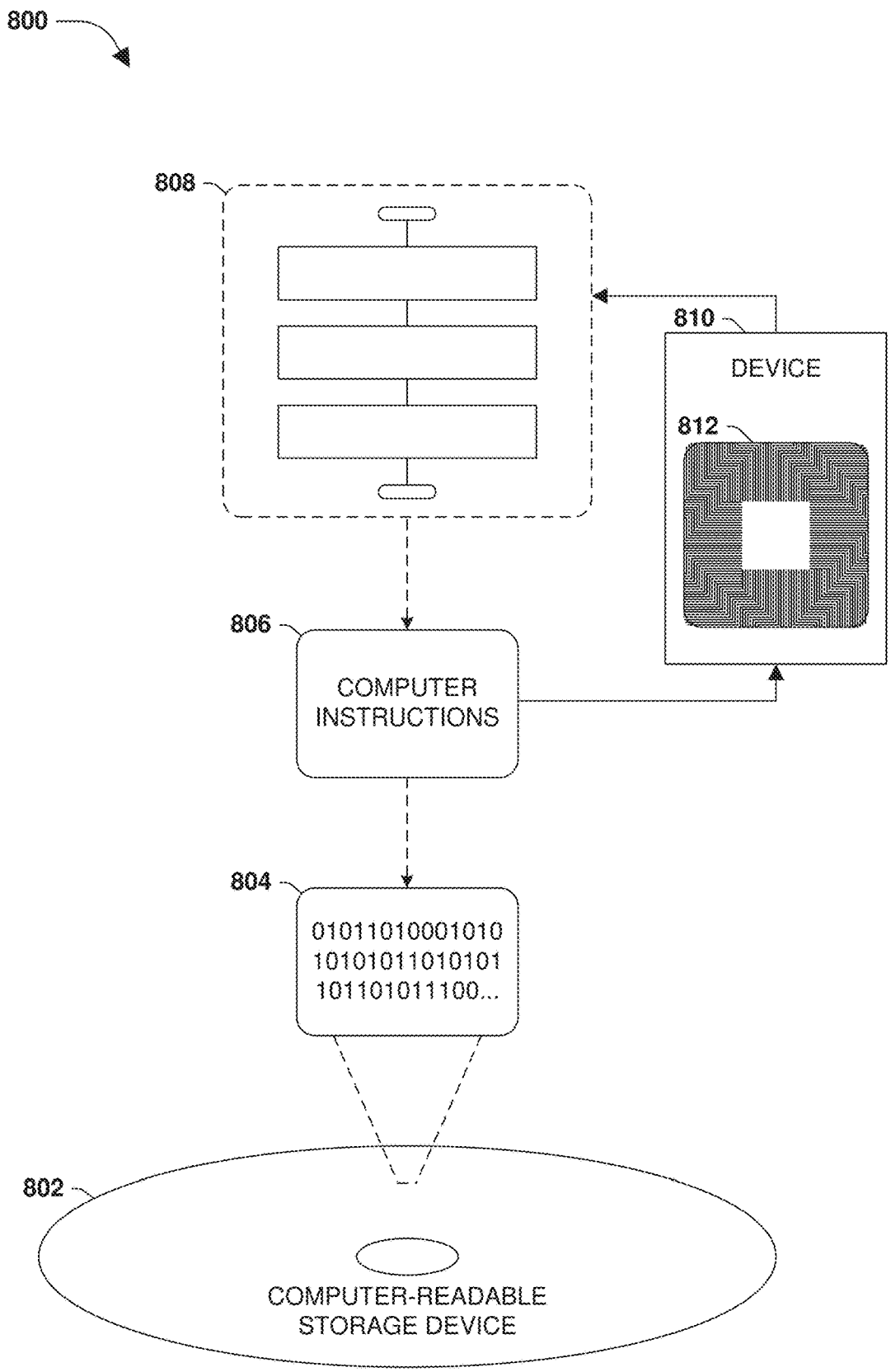
FIG. 8 is an illustration of an exemplary computer readable medium wherein processor-executable instructions configured to embody one or more of the provisions set forth herein may be comprised in accordance with at least some of the techniques presented herein.

An example computer-readable medium that may be devised in these ways is illustrated in FIG. 8, wherein the implementation 800 comprises a computer-readable memory device 802 (e.g., a CD-R, DVD-R, or a platter of a hard disk drive), on which is encoded computer-readable data 804. This computer-readable data 804 in turn comprises a set of computer instructions 806 that, when executed on a processor 812 of a device 810, provide an embodiment that causes the device 810 to operate according to the techniques presented forth herein. In some embodiments, the device 810 may correspond to a hover detection module, a sensor array, a touch panel, a printer, a kiosk, etc. Many such computer-readable media may be devised by those of ordinary skill in the art that are configured to operate in accordance with the techniques presented herein. In some embodiments, the processor-executable computer instructions 806 are configured to perform a method 808, such as at least some of the exemplary method 300 of FIG. 3 and/or at least some of the exemplary method 600 of FIG. 6, for example. In some embodiments, the processor-executable computer instructions 804 are configured to implement a system, such as at least some of the exemplary hover detection module 101, for example. Many such computer-readable media are contemplated to operate in accordance with the techniques presented herein.

An embodiment of the presently disclosed techniques includes a method. The method includes in response to receiving measured signal data detected by a sensor array of a device, creating a generated representation from the measured signal data; comparing the generated representation with a measured representation of the measured signal data to create a correlation coefficient corresponding to a correlation between the generated representation and the measured representation of the measured signal data; in response to the correlation coefficient exceeding a first threshold, detecting a hover event for the device; and in response to the correlation coefficient not exceeding the first threshold, determining that the measured signal data is not indicative of the hover event.

According to some embodiments, the method includes creating the generated representation in real-time during operation of the sensor array detecting objects proximate a display of the device.

According to some embodiments, the method includes in response to detecting the hover event, transmitting a signal to the device to indicate that the hover event occurred.

According to some embodiments, the signal triggers the device to perform an operation determined based upon the hover event occurring.

According to some embodiments, the method includes creating a generated curve from the measured signal data, the measured representation comprises a measured curve corresponding to a plot of the measured signal data, and comparing the generated representation to the measured representation comprises determining a similarity between the generated curve and the measured curve to create the correlation coefficient.

According to some embodiments, the method includes in response to the correlation coefficient not exceeding the first threshold, determining that the measured signal data is noise.

According to some embodiments, the method includes in response to detecting the hover event, performing position filtering using the measured signal data to determine a hover position associated with the hover event.

According to some embodiments, the method includes filtering the measured signal data to remove noise from the measured signal data to create filtered measured signal data; performing a baseline update for the sensor array to create baseline sensor information; modifying the filtered measured signal data based upon the baseline sensor information to create modified measured signal data; and generating the measured representation using the modified measured signal data.

According to some embodiments, the method includes comparing an average of the modified measured signal data with a second threshold; and in response to the average of the modified measured signal data exceeding the second threshold, performing hover and position detection to determine whether the hover event occurred and to identify a position of the hover event.

According to some embodiments, the method includes comparing an average of the modified measured signal data with a second threshold; and in response to the average of the modified measured signal data not exceeding the second threshold, determining that the measured signal data is not indicative of the hover event.

According to some embodiments, the method includes comparing an average of the modified measured signal data with a second threshold; in response to the average of the modified measured signal data not exceeding the second threshold, comparing the average of the modified measured signal data to a third threshold; and in response to the average of the modified measured signal data exceeding the third threshold, determining and transmitting to the device a proximity of an object detected by the sensor array as the measured signal data.

According to some embodiments, the method includes comparing an average of the modified measured signal data with a second threshold; in response to the average of the modified measured signal data not exceeding the second threshold, comparing the average of the measured signal data to a third threshold; and in response to the average of the modified measured signal data not exceeding the third threshold, determining that no object has been detected by the sensor array as the measured signal data.

According to some embodiments, the method includes in response to the correlation coefficient not exceeding the first threshold, determining and transmitting to the device a proximity of an object detected by the sensor array as the measured signal data.

According to some embodiments, the method includes creating the generated representation based upon a best-fit Gaussian curve from the measured signal data.

An embodiment of the presently disclosed techniques includes a non-transitory machine-readable storage medium. The non-transitory machine-readable storage medium includes machine executable code, which when executed by a machine, causes the machine to construct a Gaussian distribution using measured signal data detected by a sensor array of a device; calculate a Pearson correlation coefficient between the Gaussian distribution and a measured signal profile of the measured signal data, wherein the Pearson correlation coefficient represents a similarity between the Gaussian distribution and the measured signal profile; in response to the Pearson correlation coefficient exceeding a first threshold, detect a hover event of an object with respect to the sensor array; and in response to the Pearson correlation coefficient not exceeding the first threshold, determine that the measured signal data is not indicative of the hover event.

According to some embodiments, the machine executable code causes the machine to identify a first set of sensors that detected a subset of the measured signal data; identify a second set of sensors that did not detect the subset of the measured signal data; form an extended vector of measured signal data by mirroring the subset of the measured signal data as a mirrored subset of the measured signal data for association with the second set of sensors; and utilize the extended vector as the measured signal profile.

According to some embodiments, the machine executable code causes the machine to in response to determining that the measured signal data was detected by a threshold number of edge sensors of the sensor array, calculate one or more virtual sensors with virtual sensor signal data to include within the measured signal data.

According to some embodiments, the machine executable code causes the machine to utilize a shape criterion and a mass criterion to identify a candidate for a global maximum search to identify a global maximum value of the measured signal profile, wherein the candidate for the global maximum is determined as an index of a sensor with a largest mass of signals around the sensor using the mass criterion and the shape criterion.

An embodiment of the presently disclosed techniques includes a system. The system includes a sensor array of sensors configured to measure capacitance signal values as sets of measured signal data; and a hover detection module configured to: receive a set of measured signal data detected by the sensor array; create a generated representation from the set of measured signal data; compare the generated representation with a measured representation of the set of measured signal data to create a correlation coefficient corresponding to a correlation between the generated representation and the measured representation of the set of measured signal data; in response to the correlation coefficient exceeding a first threshold, detect a hover event of an object hovering relative to the sensor array; and in response to the correlation coefficient not exceeding the first threshold, determine that the set of measured signal data is not indicative of the hover event.

According to some embodiments, the hover detection module calculates a position of the hover event as a vertex of a generated representation in response to the correlation coefficient exceeding the first threshold.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application can generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application

What is claimed is:

1. A method, comprising:
   in response to receiving measured signal data detected by a sensor array of a device, creating a generated representation from the measured signal data;
   comparing the generated representation with a measured representation of the measured signal data to create a correlation coefficient corresponding to a correlation between the generated representation and the measured representation of the measured signal data;
   in response to the correlation coefficient exceeding a first threshold, detecting a hover event for the device; and
   in response to the correlation coefficient not exceeding the first threshold, determining that the measured signal data is not indicative of the hover event.

2. The method of claim 1, wherein creating the generated representation comprises:
creating the generated representation in real-time during operation of the sensor array detecting objects proximate a display of the device.

3. The method of claim 1, comprising:
in response to detecting the hover event, transmitting a signal to the device to indicate that the hover event occurred.

4. The method of claim 3, wherein the signal triggers the device to perform an operation determined based upon the hover event occurring.

5. The method of claim 1, wherein:
creating the generated representation comprises creating a generated curve from the measured signal data, the measured representation comprises a measured curve corresponding to a plot of the measured signal data, and
comparing the generated representation to the measured representation comprises determining a similarity between the generated curve and the measured curve to create the correlation coefficient.

6. The method of claim 1, comprising:
in response to the correlation coefficient not exceeding the first threshold, determining that the measured signal data comprises noise.

7. The method of claim 1, comprising:
in response to detecting the hover event, performing position filtering using the measured signal data to determine a hover position associated with the hover event.

8. The method of claim 1, comprising:
filtering the measured signal data to remove noise from the measured signal data to create filtered measured signal data;
performing a baseline update for the sensor array to create baseline sensor information;
modifying the filtered measured signal data based upon the baseline sensor information to create modified measured signal data; and
generating the measured representation using the modified measured signal data.

9. The method of claim 8, comprising:
comparing an average of the modified measured signal data with a second threshold; and
in response to the average of the modified measured signal data exceeding the second threshold, performing hover and position detection to determine whether the hover event occurred and to identify a position of the hover event.

10. The method of claim 8, comprising:
comparing an average of the modified measured signal data with a second threshold; and
in response to the average of the modified measured signal data not exceeding the second threshold, determining that the measured signal data is not indicative of the hover event.

11. The method of claim 8, comprising:
comparing an average of the modified measured signal data with a second threshold;
in response to the average of the modified measured signal data not exceeding the second threshold, comparing the average of the modified measured signal data to a third threshold; and
in response to the average of the modified measured signal data exceeding the third threshold, determining and transmitting to the device a proximity of an object detected by the sensor array as the measured signal data.

12. The method of claim 8, comprising:
comparing an average of the modified measured signal data with a second threshold;
in response to the average of the modified measured signal data not exceeding the second threshold, comparing the average of the measured signal data to a third threshold; and
in response to the average of the modified measured signal data not exceeding the third threshold, determining that no object has been detected by the sensor array as the measured signal data.

13. The method of claim 1, comprising:
in response to the correlation coefficient not exceeding the first threshold, determining and transmitting to the device a proximity of an object detected by the sensor array as the measured signal data.

14. The method of claim 1, wherein creating the generated representation comprises:
creating the generated representation based upon a best-fit Gaussian curve relative to the measured signal data.

15. A non-transitory machine-readable storage medium comprising machine executable code, which when executed by a machine, causes the machine to:
construct a Gaussian distribution using measured signal data detected by a sensor array of a device;
calculate a Pearson correlation coefficient between the Gaussian distribution and a measured signal profile of the measured signal data, wherein the Pearson correlation coefficient represents a similarity between the Gaussian distribution and the measured signal profile;
in response to the Pearson correlation coefficient exceeding a first threshold, detect a hover event of an object with respect to the sensor array; and
in response to the Pearson correlation coefficient not exceeding the first threshold, determine that the measured signal data is not indicative of the hover event.

16. The non-transitory machine-readable storage medium of claim 15, wherein the machine executable code causes the machine to:
identify a first set of sensors that detected a subset of the measured signal data;
identify a second set of sensors that did not detect the measured signal data;
form an extended vector of measured signal data by mirroring the subset of the measured signal data as a mirrored subset of the measured signal data for association with the second set of sensors; and
utilize the extended vector as the measured signal profile.

17. The non-transitory machine-readable storage medium of claim 15, wherein the machine executable code causes the machine to:
in response to determining that the measured signal data was detected by a threshold number of edge sensors of the sensor array, calculate one or more virtual sensors with virtual sensor signal data to include within the measured signal data.

18. The non-transitory machine-readable storage medium of claim 15, wherein the machine executable code causes the machine to:
utilize a shape criterion and a mass criterion to identify a candidate for a global maximum search to identify a global maximum value of the measured signal profile, wherein the candidate for the global maximum is determined as an index of a sensor with a largest mass of signals around the sensor using the mass criterion and the shape criterion.

19. A system, comprising:
- a sensor array of sensors configured to measure capacitance signal values as sets of measured signal data; and
- a hover detection module configured to:
  - receive a set of measured signal data detected by the sensor array;
  - create a generated representation from the set of measured signal data;
  - compare the generated representation with a measured representation of the set of measured signal data to create a correlation coefficient corresponding to a correlation between the generated representation and the measured representation of the set of measured signal data;
  - in response to the correlation coefficient exceeding a first threshold, detect a hover event of an object hovering relative to the sensor array; and
  - in response to the correlation coefficient not exceeding the first threshold, determine that the set of measured signal data is not indicative of the hover event.

20. The system of claim 19, wherein the hover detection module calculates a position of the hover event as a vertex of a generated representation in response to the correlation coefficient exceeding the first threshold.

* * * * *